May 31, 1960 J. O. BRAFFORD 2,938,601
ENGINE OIL PAN
Filed March 20, 1958 5 Sheets-Sheet 4
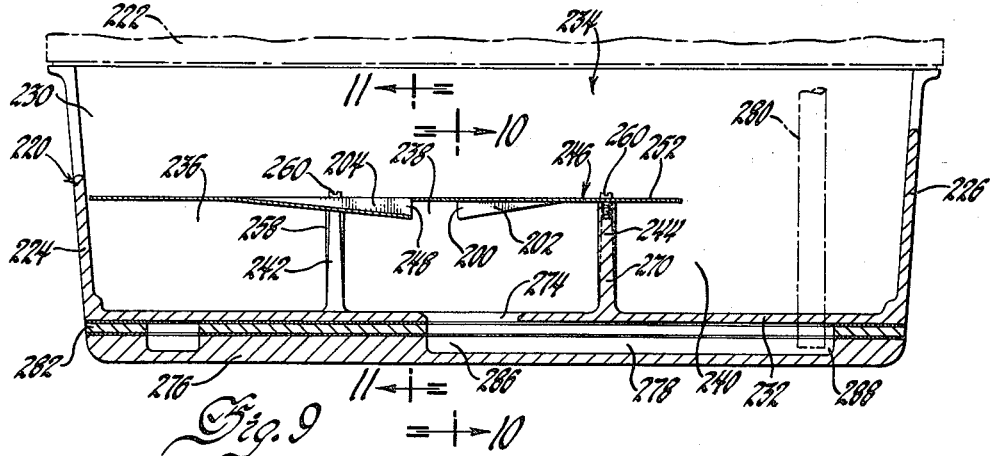
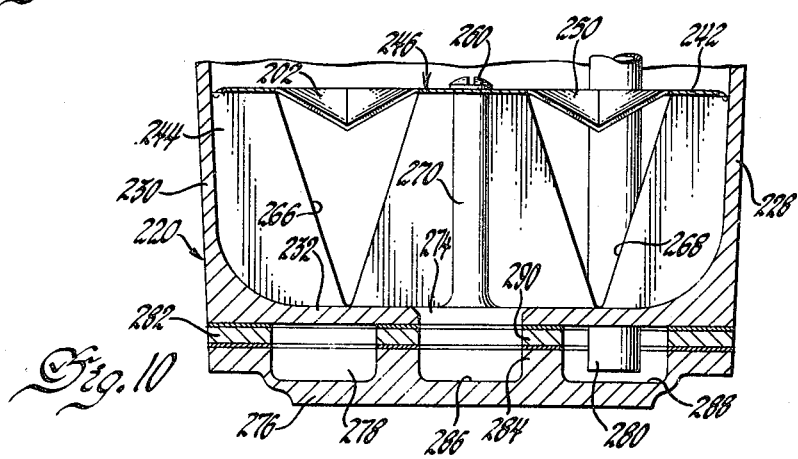
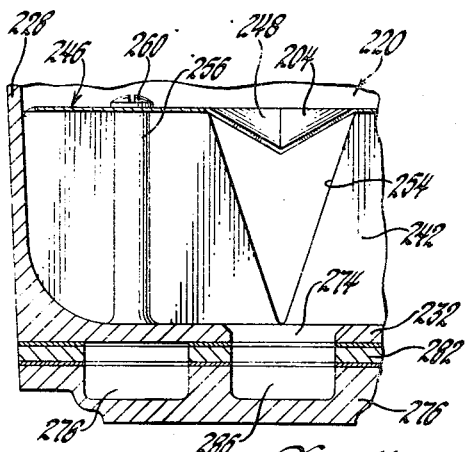
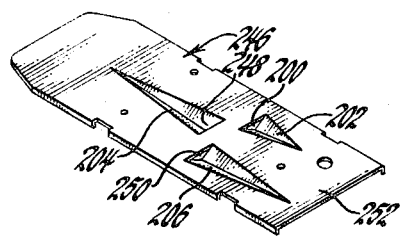
INVENTOR.
James O. Brafford
BY
ATTORNEY May 31, 1960  J. O. BRAFFORD  2,938,601
ENGINE OIL PAN
Filed March 20, 1958  5 Sheets-Sheet 5

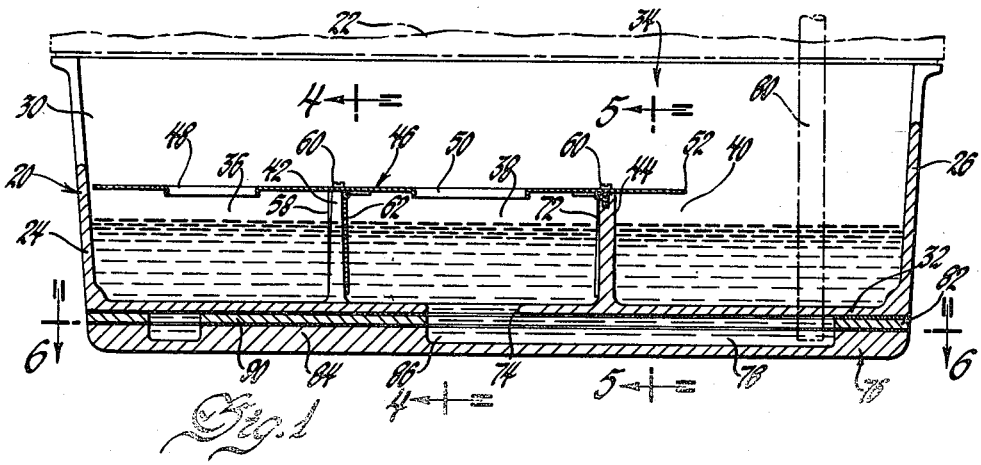
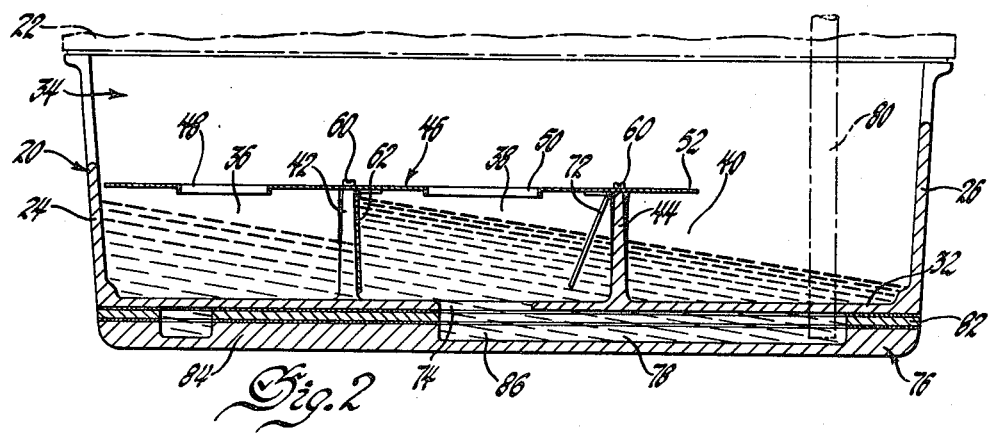
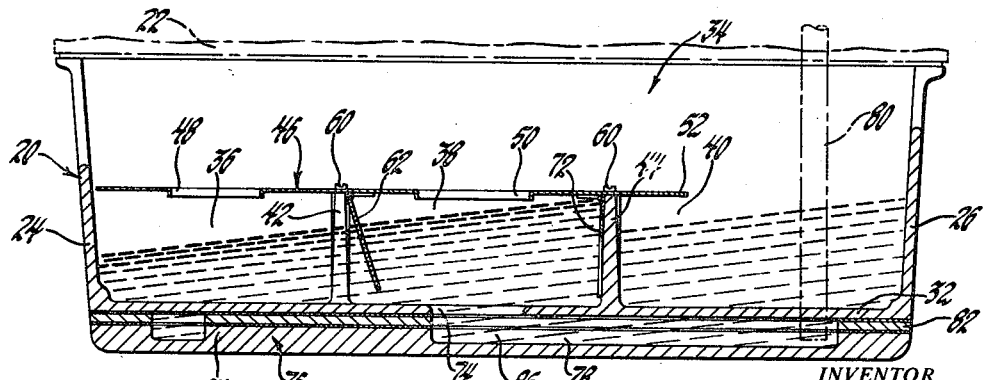

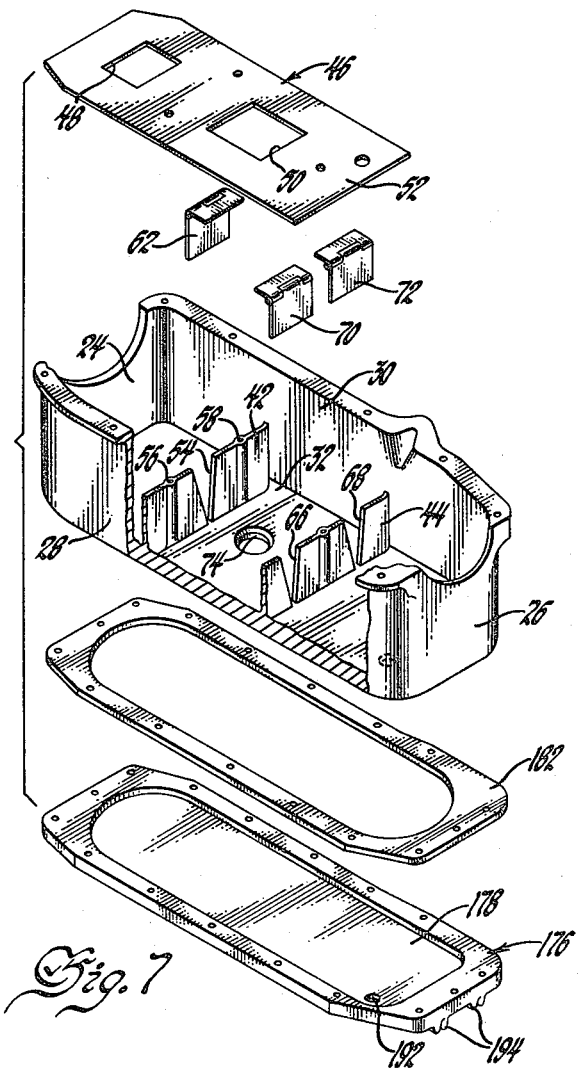

INVENTOR.
James O. Brafford
BY
L. D. Burch
ATTORNEY

United States Patent Office 2,938,601
Patented May 31, 1960

2,938,601

ENGINE OIL PAN

James O. Brafford, Pontiac, Mich., assignor to General Motors Corporation, Detroit, Mich., a corporation of Delaware Filed Mar. 20, 1958, Ser. No. 722,763

7 Claims. (Cl. 184—103)

The invention relates to oil pans for engines and is particularly applicable to engines in automotive vehicles. It has long been a problem in the engines of automotive vehicles to maintain a satisfactory oil level within the oil pan under all vehicle conditions. When the vehicle is stationary, the oil seeks the lowest level within the oil pan and the oil pump intake is usually located in this area. When the vehicle is being driven upgrade, however, the oil tends to shift to the rear of the oil pan reservoir. When the vehicle is being driven downgrade, the oil tends to shift to the front of the reservoir. These conditions are also obtained during sudden accelerations and decelerations. When the oil shifts in this manner, cavitation of the pump oil may result as well as excessive sloshing and oil aeration. These conditions are undesirable and applicant's invention overcomes them by preventing major oil shifting movement away from the oil intake.

This may be accomplished in several different ways and the modifications disclosed and claimed comprise typical embodiments of the invention. The oil pan may be divided into a series of compartments with baffle walls extending transversely of the pan. These baffle walls will reduce the effective free surface area of the oil in the oil pan by dividing it into several smaller areas. Various means for preventing or slowing the movement of oil between compartments under the various conditions encountered are provided. These means may include weirs, flapper valves and baffles. They are arranged to maintain the maximum oil level to the inlet pipe for the oil pump at all times. Oil pans embodying the invention also may be provided with means for better heat dissipation. Other means may be provided which will also aid in maintaining a constant oil supply for the oil pump.

In the drawings:

Figure 1 is a longitudinal vertical section view of an oil pan embodying applicant's invention and showing the oil within the pan when the vehicle in which the engine is installed is stationary.

Figure 2 shows the oil pan of Figure 1 in vertical section when the vehicle is on a downgrade or decelerating.

Figure 3 shows the oil pan of Figure 1 in vertical section when the vehicle is on an upgrade or accelerating.

Figure 7 is an exploded isometric view of the oil pan of Figure 1 with a modified bottom plate.

Figure 8 is an isometric view of a modified bottom plate which may be used with the oil pan of Figures 1–7.

Figure 9 is a longitudinal vertical section view showing a modification of the oil pan of Figure 1.

Figure 10 is a cross section view of the oil pan of Figure 9 taken in the direction of arrows 10—10 of that figure and having parts broken away.

Figure 11 is a cross section view of the oil pan of Figure 9 taken in the direction of arrows 11—11 of that figure and having parts broken away.

Figure 12 is an isometric view of the top baffle portion of the oil pan of Figure 9.

Figure 4:
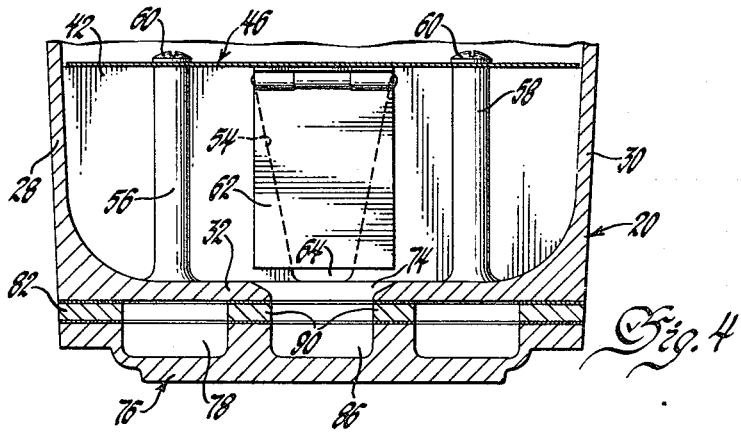
Figure 4 is a cross section view of the oil pan of Figure 1 taken in the direction of arrows 4—4 of that figure and having parts broken away.
Figure 5:
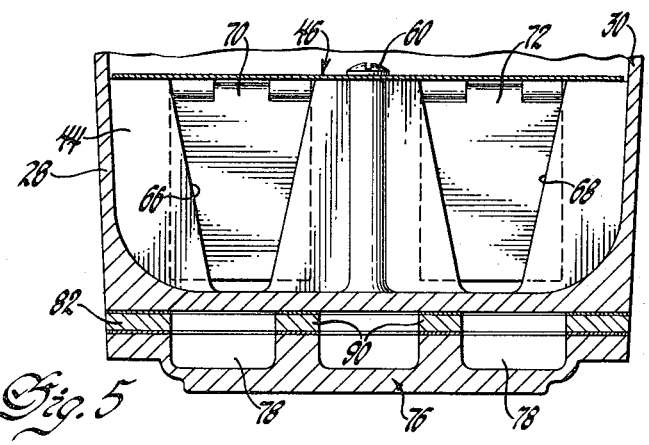
Figure 5 is a cross section view of the oil pan of Figure 1 taken in the direction of arrows 5—5 of that figure and having parts broken away.
Figure 6:
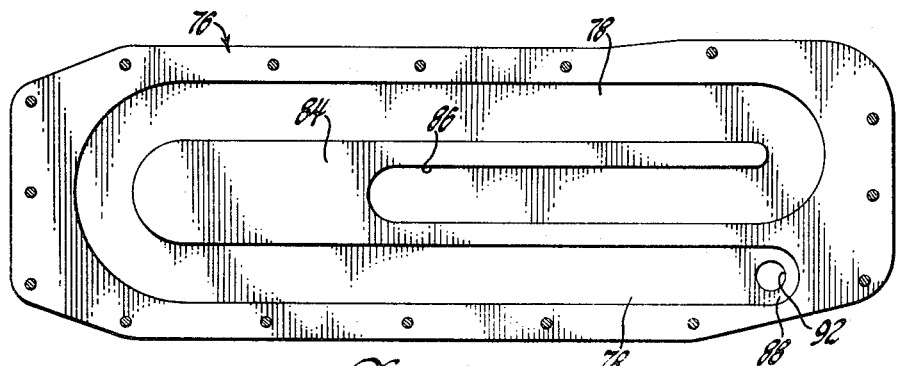
Figure 6 is a plan view of the bottom plate of the oil pan of Figure 1 taken in the direction of arrows 6—6 of that figure.

Referring now to the oil pan shown in Figures 1 through 8, the pan 20 is attached to the underside of the engine block 22 as is well known in the art. The pan includes front end wall 24, rear end wall 26, side walls 28 and 30, and bottom panel 32. The pan may be formed of sheet metal or cast, and is shown in these figures as being cast. The oil reservoir 34 is defined by the side and end walls and the bottom panel, and is divided into compartments 36, 38, and 40 by transversely extending baffle walls 42 and 44. These walls may be integrally formed with the oil pan if the pan is cast, as shown, or may be assembled from sheet metal. A top baffle member 46 may be secured to the upper edges of the baffle walls 42 and 44 and extend over a substantial portion of each of the compartments 36 and 40 as well as the entire portion of compartment 38. Baffle member 46 is positioned so that it is clear of the engine crank shaft and throws which are received within the upper portion of the reservoir 34. Baffle member 46 is provided with apertures 48 and 50 which are positioned over the compartments 36 and 38 in order that oil discharged from the engine may be provided with easy access to these compartments. The rear end 52 of baffle member 46 may be spaced sufficiently from the rear end wall 26 of the oil pan to permit an oil pump inlet pipe to be installed in that portion of the oil pan.

Baffle wall 42 may be provided with a centrally disposed opening 54 which is shown somewhat V shaped. The baffle wall may also be provided with bosses 56 and 58 to which the top baffle member 46 may be secured by any suitable means such as bolts 60. The top baffle member 46 may have a hinged flap 62 secured thereto and extending downwardly immediately adjacent opening 54 so that it normally rests against one side of that opening and substantially closes the opening. Flap 62 may be slightly shorter than the opening 54 if desired to leave a small area 64 at the lower end thereof which is never covered by the flap.

Baffle wall 44 may be provided with openings 66 and 68 which are generally similar to opening 54 in wall 42. Openings 66 and 68 are preferably positioned on either side of the oil pan centerline so that they are not in direct alignment with opening 54. The top baffle member 46 is also provided with hinged flaps 70 and 72 which are disposed adjacent openings 66 and 68 in a manner generally similar to flap 62 in relation to the opening 54. Flaps 62, 70, and 72 are all positioned within compartment 38. They are freely hinged so that they may swing easily under the influence of oil movement through the openings 54, 66, and 68. The flap 62 permits flow of oil through opening 54 from compartment 36 to compartment 38 when the vehicle is accelerating or going upgrade. This action is shown in Figure 3. Under either of these conditions, flaps 70 and 72 are held by the action of oil within compartment 38 so that they effectively prevent any substantial flow of oil from compartment 38 to compartment 40. Thus, the oil is trapped in compartment 38 under these conditions and a relatively high oil level is maintained therein.

When the vehicle is decelerating or on a downgrade, the reverse action takes place. Oil is permitted to flow from compartment 40 to compartment 38 with virtually no restriction, since flaps 70 and 72 pivot outwardly into compartment 38 and uncover openings 66 and 68. Flap 62 is held against baffle wall 42, however, and substantially prevents flow of oil from compartment 38 into compartment 36 through the opening 54.

None of the flaps completely prevent the flow of oil between adjacent compartments if they are so arranged that they do not cover the lower ends of their respective openings. This arrangement is preferred so that a limited amount of oil flow can be transferred under any condition. Should the flaps become stuck in a closed position, for example, oil will not be completely prevented from flowing to the inlet of the engine oil pump.

The oil within compartment 38 is supplied to the engine oil pump through opening 74 provided in that portion of bottom panel 32 which forms the bottom of compartment 38. The oil pan has a bottom plate 76 which is secured underneath bottom panel 32. This plate is formed to provide a relatively shallow reservoir 78. This reservoir is connected with opening 74 and the oil inlet pipe 80 extends through compartment 40 and bottom panel 32 from the engine block 22 and is received within the reservoir 78. When the engine is running, oil is supplied through pipe 80 and reservoir 78 from chamber 38 to supply the engine with oil. If a larger oil reservoir capacity is desired, a sandwich plate 82 may be provided intermediate the bottom panel 32 and the bottom plate 76 to increase the capacity of reservoir 78.

The bottom plate 76 shown in Figures 1 through 6 has a divider 84 formed therewith which provides a serpentine reservoir for increased oil cooling effect. The intake end 86 of the serpentine reservoir 78 is provided to cooperate with opening 74 so that oil may pass from compartment 38 into the reservoir. The oil then flows along the serpentine path and at the outlet end 88 passes into the oil pump inlet pipe 80. If the sandwich plate 82 is used with a serpentine reservoir bottom plate, it is also provided with a divider 90 which is similar to divider 84. Thus the serpentine path of the oil is maintained with the use of a sandwich plate.

Bottom plate 76 may be modified to provide a simple shallow reservoir such as reservoir 178 formed by the bottom plate 176 of Figure 7. If a bottom plate similar to bottom plate 176 of vehicle 7 is used with a sandwich plate, the sandwich plate may be formed similar to sandwich plate 182 of Figure 7.

The bottom plates 76 and 176 shown in Figures 7 and 8 are provided with oil drain holes 92 and 192 in order that the oil may be completely drained from the lower reservoir 78 when desired. These bottom plates may also be provided with air cooled fins 94 and 194 in order to provide further cooling of the oil within the reservoir as it flows therethrough.

The modified oil pan shown in Figures 9 through 12 is similar to the oil pan of Figures 1 through 8, but uses weirs to restrict the flow of oil between adjacent compartments instead of flapper valves. The pan 220 is secured underneath the engine block 222 and is formed by front end wall 224, rear end wall 226, side walls 228 and 230, and bottom panel 232. These walls and panels thus define the oil reservoir 234. This reservoir is divided into a series of compartments 236, 238, and 240 by transverse baffle walls 242 and 244. A top baffle member 246 is secured to the upper edges of baffle walls 242 and 244 and extends over the entire top of compartment 238 as well as over substantial portions of compartment 236 and 240. The rear end 252 of baffle member 246 is preferably spaced sufficiently from rear end wall 226 of the oil pan to permit the oil pump inlet pipe 280 to be installed in that portion of the oil pan.

Baffle member 246 is provided with apertures 200, 248, and 250. These apertures are formed by striking depressed V-sections 202, 204, and 206 downwardly and at an angle from the surface of the baffle member so as to provide scooped formations having open ends defining the apertures 200, 248, and 250. Each of these apertures opens into compartment 238. V-section 204 extends toward front end wall 224 from aperture 248 while V-sections 202 and 206 extend toward rear end wall 226 from apertures 200 and 250.

Baffle wall 242 is provided with a centrally disposed opening 254 which is shown as being V-shaped to provide a weir. Other weir shapes which are well known in the art of constructing weirs may also be provided. Wall 242 may also have bosses 256 and 258 to which the top baffle member 246 may be secured by any suitable means such as bolts 260.

Baffle wall 244 may be provided with spaced weir openings 266 and 268 which are generally similar to opening 254 in baffle wall 242. Openings 266 and 268 are preferably located on either side of the centerline of the oil pan so that neither of them is in direct alignment with openings 254 of wall 242. Wall 244 may be provided with a boss 270 to which baffle member 246 may be secured by bolt 260.

Bottom panel 232 is provided with an opening 274 which is positioned within the bottom of compartment 238. This opening leads to the reservoir 278 formed by bottom plate 276 when that plate is attached to the oil pan 220.

V-section 204 of top baffle member 246 may be positioned so that it extends downwardly into the top portion of opening 254 as is clearly shown in Figure 9. Aperture 248 is thus positioned within the forward portion of compartment 238. V-sections 202 and 206 may be positioned in alignment with openings 266 and 268 as is shown in Figure 9, or they may extend slightly into the upper portions of those openings in a manner similar to V-section 204 in relation to opening 254. The slanted surfaces of the V-sections permit oil from the engine components to run downwardly into chamber 238, thus assisting in maintaining the oil level in this chamber. They also prevent the sloshing of oil out of chamber 238 when the level of oil within that chamber tends to rise or splash above the upper edge of either of the baffle walls 242 or 244.

The weir characteristics of openings 254, 256, and 268 aid in controlling the amount of oil passing out of compartment 238 and into compartments 236 and 240 when the vehicle is on a grade or changing speed rapidly. By locating the narrow portions of these openings at the bottom, the level of oil within chamber 238 may be maintained sufficiently high to insure the covering of opening 274 so that there will always be a supply of oil for the engine oil pump. At the same time oil may flow into compartment 238 from compartments 236 and 240.

The bottom plate 276 is shown in Figures 9-11 as having a serpentine reservoir 278 similar to the serpentine reservoir shown with the oil pan of Figures 1 through 6. Reservoir 278 has an intake end 286 and an outlet end 288 to provide for oil flow from chamber 238 to pipe 280 through the reservoir. Divider 284 defines the inner walls of reservoir 278. If desired, a sandwich plate 282 may be provided to increase the oil capacity of reservoir 278. Should the serpentine type bottom plate be used, the sandwich plate 282 should also be formed with a serpentine configuration by providing divider 290. A bottom plate similar to bottom plate 176 of Figure 7 may be used if desired. In either case the oil pump inlet pipe 280 extends downwardly through bottom panel 232 and connects with reservoir 278 so that oil may be transferred from the reservoir to the engine oil pump.

The modified oil pan shown in Figures 13 through 16 will now be described. The pan 320 is attached to the underside of engine block 322 by any suitable means. The pan is illustrated as being formed from sheet metal and has a profile typical of present oil pans. The front end wall 324 is relatively low and the connecting bottom panel 332 extends rearwardly and downwardly from this wall to a point slightly beyond the center of the engine. A second front end wall 300 extends downwardly from this point and then rearwardly to provide a second bottom panel 302. Rear end wall 326 extends upwardly from bottom panel 302 to the point where the pan 320 joins the engine block. The pan is also provided with side walls 328 and 330 to define the oil reservoir 334. A forward oil compartment 336 is formed from reservoir 334 by the front end wall 324, the bottom panel 332, side walls 328 and 330, and a transverse baffle wall 342 which is attached to bottom panel 332 and extends upwardly beyond the second forward end wall 300. Baffle wall 342 may be provided with securing tabs 304, 306, and 308 to secure the wall to the bottom panel 332 and the side walls 328 and 330. Any suitable securing means may be used. A rear oil compartment 338 is formed by end walls 300 and 326, baffle wall 342, bottom wall 302, and side walls 328 and 330. Compartment 338 is deeper than compartment 336 to provide a deep reservoir for the oil being held by the oil pan and supplied to the engine through oil pump inlet pipe 380.

Figure 13:
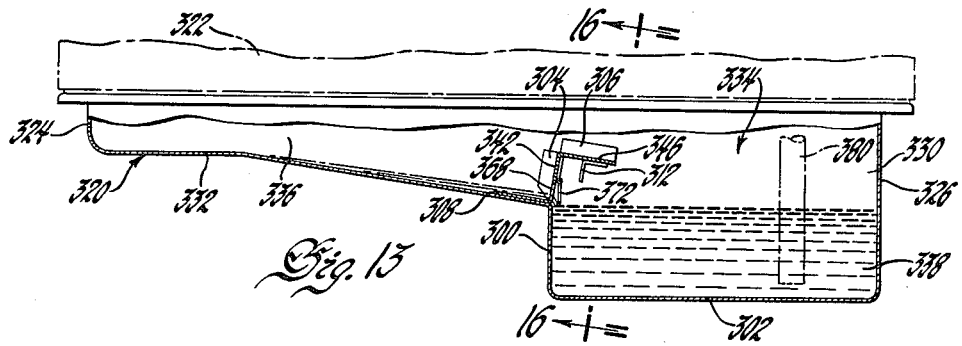
Figure 13 is an elevation view of another modification of the invention and has parts broken away and in section. The oil in the oil pan is shown with the vehicle at rest.
Figure 14:
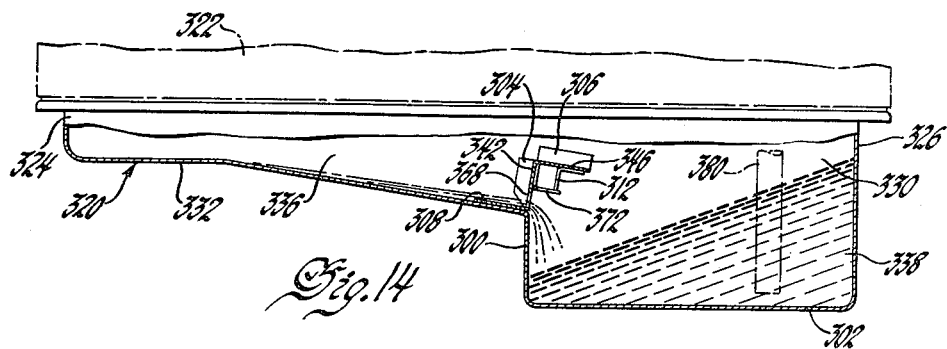
Figure 14 is an elevation view of the oil pan of Figure 13 with parts broken away and in section and shows the oil in the reservoir when the vehicle is on an upgrade or accelerating.
Figure 15:
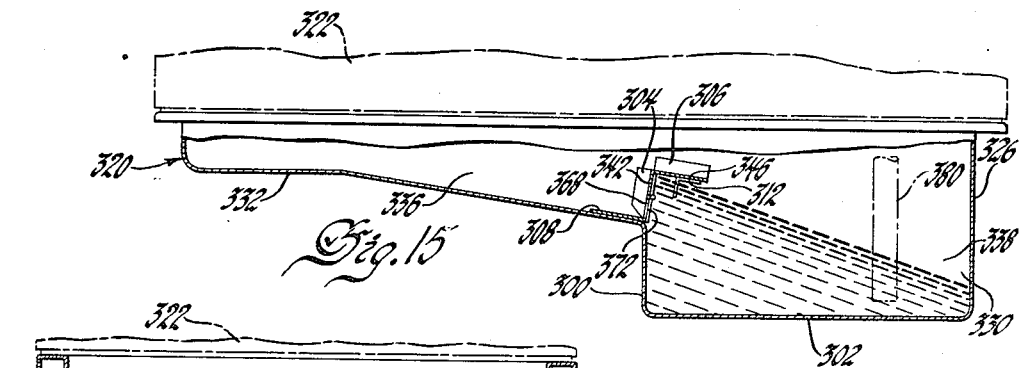
Figure 15 is similar to Figure 14 but shows the oil in the oil pan when the vehicle is on a downgrade or decelerating.
Figure 16:
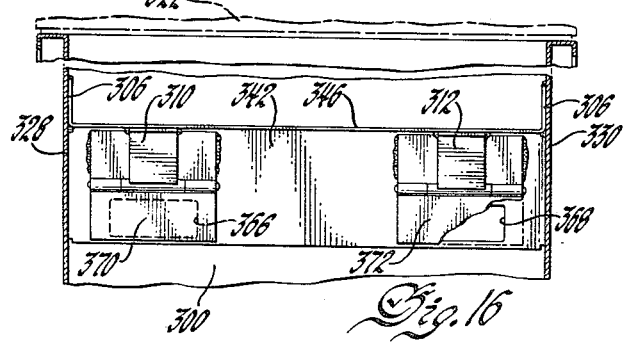
Figure 16 is a cross section view of the oil pan shown in Figure 13 taken in the direction of arrows 16—16 of that figure and having parts broken away.

Baffle wall 342 has a horizontally extending section 346 which acts as a horizontal baffle member to aid in retaining oil within compartment 338 under the variable conditions encountered. The generally vertical portion of baffle wall 342 is provided with one or more apertures, two apertures 366 and 368 being illustrated in this instance. Hinged flapper valves 370 and 372 are pivotally secured to the rear side of the vertical portion of baffle wall 342 so that they overlap and cover apertures 366 and 368. If the baffle wall 342 is slightly off vertical as shown in the figures, the valves 370 and 372 will leave a slight opening, under stationary conditions, instead of fully closing apertures 366 and 368. This position of the flapper valves is shown in Figure 13.

The horizontally extending section 346 of the baffle wall may be provided with stops 310 and 312 which are aligned with apertures 366 and 368 to engage flapper valves 370 and 372 at their maximum open positions. These stops prevent valves 370 and 372 from extending upwardly into engagement with the horizontally extending baffle section 346. Thus the valves will not tend to stick and will be readily returned to the generally vertical position shown in Figure 13 either by gravity or oil acting on their upper surfaces. Valves 370 and 372 are pivoted horizontally to open into compartment 338. Oil may readily flow through the apertures 366 and 368 from compartment 336 to compartment 338. The valves will close these openings, however, when oil attempts to flow in the opposite direction. Thus oil is not permitted to be retained in compartment 336 in any large quantity, thereby assuring a constant and adequate oil supply in compartment 338 for the engine oil pump under all conditions of road grades, acceleration, and deceleration.

The structures disclosed which embody applicant's invention thus are seen to prevent a substantial amount of sloshing of oil within an oil pan reservoir by reducing the free surface area of the oil through compartmentation. They also aid in retaining an adequate supply of oil at the engine oil pump intake pipe at all times to prevent the engine oil pump from cavitating. There is thus less likelihood of injury to the engine due to an insufficient or aerated oil supply.

What is claimed is:

1. In combination in an oil pan for an internal combustion engine, a first reservoir defined by side and end walls and a bottom panel, a second reservoir defined by a base plate and said bottom panel, said base plate being secured to said bottom panel with portions in spaced relation therewith to form said second reservoir, a plurality of spaced baffle walls extending between said side walls in said first reservoir to form a plurality of compartments therein, said baffle walls having apertures formed therein to permit limited oil flow between adjacent of said compartments said bottom panel having an aperture formed therein and connecting one of said compartments in direct oil flow relation with said second reservoir, and an oil pump inlet pipe extending through said first reservoir and said bottom panel and connecting with said second reservoir whereby oil may be removed from said one compartment through second reservoir.

2. An engine oil pan having side and end walls and a bottom panel defining an oil reservoir, said pan comprising baffle means received therein dividing said reservoir into forward and rear and center compartments, said baffle means having openings therein for controlling oil flow between adjacent of said compartments to permit substantial oil flow into said center compartment, a bottom plate secured underneath said bottom panel and cooperating therewith to define a second reservoir, said bottom panel having an aperture formed therein connecting said center compartment with said second reservoir, and an oil pump inlet pipe received through said first reservoir and extending into said second reservoir through which oil is removed from said center compartment through said second reservoir.

3. The engine oil pan of claim 2, said bottom plate having a divider therein to provide said second reservoir with a serpentine conformation.

4. The engine oil pan of claim 2, said pan further including a sandwich plate secured intermediate said bottom plate and said bottom panel whereby the capacity of said second reservoir is increased.

5. The engine oil pan of claim 4, said sandwich plate and said bottom plate each having complementary dividers therein to provide said second reservoir with serpentine conformation.

6. An engine oil pan having side and end walls and a bottom panel defining a reservoir, said pan including first and second vertical baffle walls transversely mounted therein whereby said reservoir is divided into forward and center and rear compartments, a baffle member transversely and horizontally mounted in said reservoir on the upper edges of said baffle whereby said center compartment and portions of said forward and rear compartments are covered, said bottom panel having an oil outlet formed therein connecting with said center compartment for delivering oil to an oil pump inlet pipe, said first baffle wall having an opening formed therein connecting one of said compartments with said center compartment in oil flow relation, said second baffle wall having a plurality of openings formed therein connecting the other of said compartments with said center compartment in oil flow relation, said baffle wall openings having one-way valve means associated therewith, said valve means being sensitive to oil flow between said compartments and permitting substantial oil flow through said openings into said center compartment from said other compartments and preventing substantial oil flow from center compartment to said other compartments.

7. An engine oil pan having side and end walls and a bottom panel defining a reservoir, said pan including first and second vertical baffle walls transversely mounted therein whereby said reservoir is divided into forward and center and rear compartments, a baffle member transversely and horizontally mounted in said reservoir on the upper edges of said baffle walls whereby said center compartment and portions of said forward and rear compartments are covered, said bottom panel having an oil outlet formed therein connecting with said center compartment for delivering oil to an oil pump inlet pipe, said first baffle wall having an opening formed therein connecting one of said compartments with said center compartment in oil flow relation, said second baffle wall having a plurality of openings formed therein connecting the other of said compartments with said center compartment in oil flow relation, said baffle wall openings being formed to provide V-notch weirs between adjacent compartments.

References Cited in the file of this patent

UNITED STATES PATENTS

| 1,000,188 | Morse | Aug. 8, 1911 |
| 1,037,383 | Wernicke | Sept. 3, 1912 |
| 1,667,728 | Fisher | May 1, 1928 |
| 1,789,579 | D'Agostino | Jan. 20, 1931 |
| 2,093,372 | Short | Sept. 14, 1937 |

FOREIGN PATENTS

| 860,044 | France | Sept. 20, 1940 |

UNITED STATES PATENT OFFICE
CERTIFICATE OF CORRECTION

Patent No. 2,938,601　　　　　　　　　　　　　　　　May 31, 1960

James O. Brafford

It is hereby certified that error appears in the printed specification of the above numbered patent requiring correction and that the said Letters Patent should read as corrected below.

Column 6, line 51, for "baffle whereby" read -- baffle walls whereby --.

Signed and sealed this 31st day of January 1961.

(SEAL)
Attest:
KARL H. AXLINE
Attesting Officer

ROBERT C. WATSON
Commissioner of Patents